3 Sheets—Sheet 1.
W. TULLY.
Tube Expander.
No. 232,317. Patented Sept. 14, 1880.
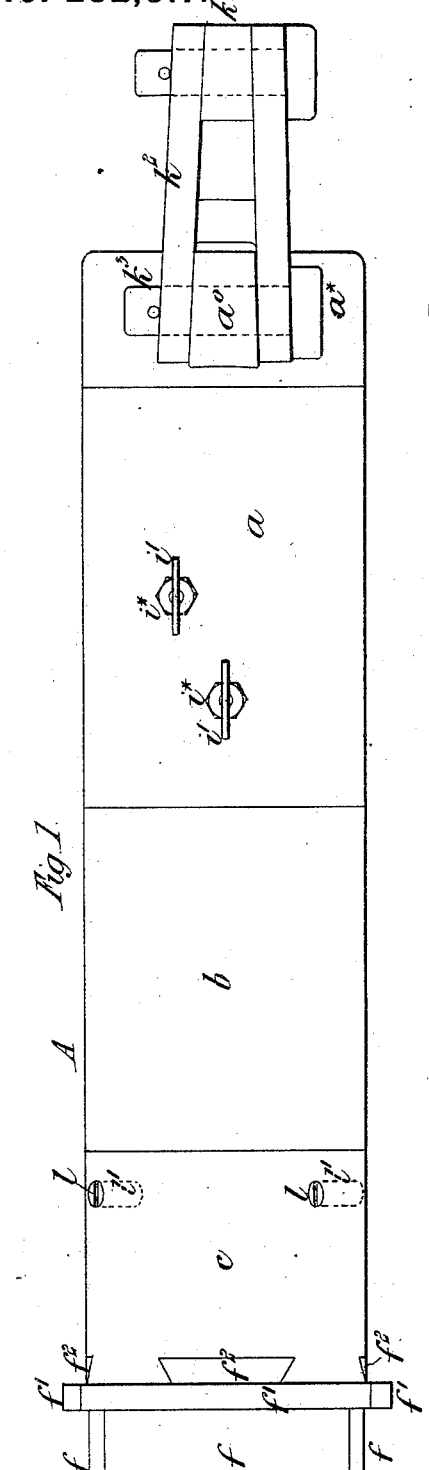
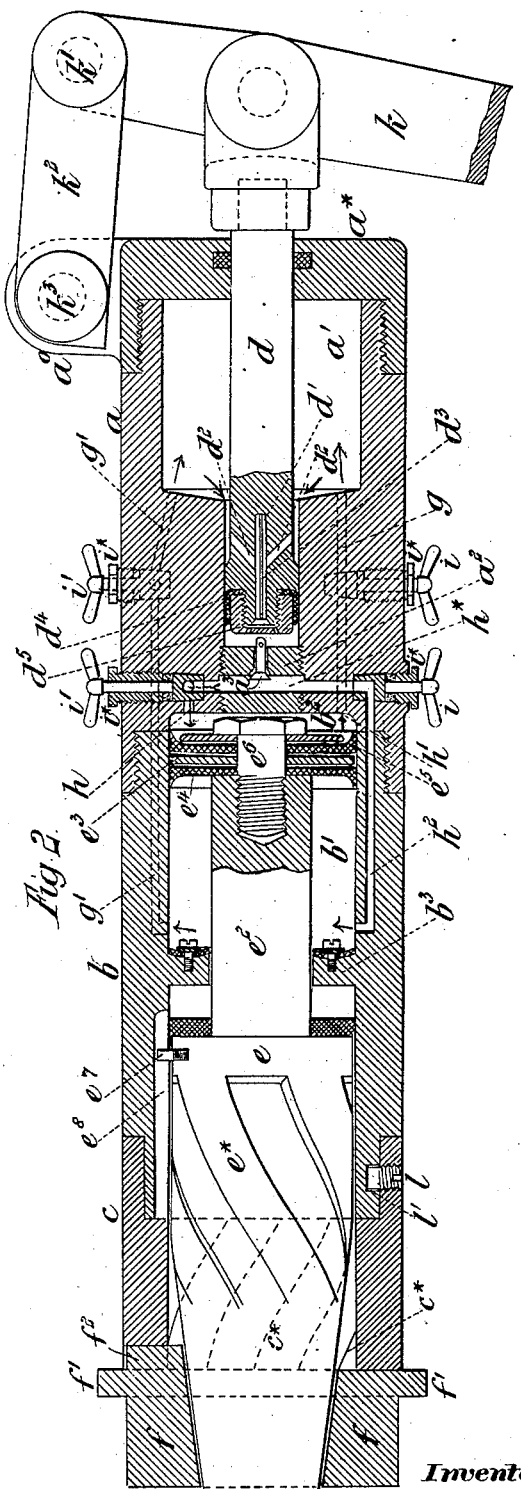
Attest:
J. A. Rutherford,
J. Henry Kaiser.
Inventor:
William Tully,
By James L. Norris,
Atty.

3 Sheets—Sheet 2.
W. TULLY.
Tube Expander.
No. 232,317. Patented Sept. 14, 1880.
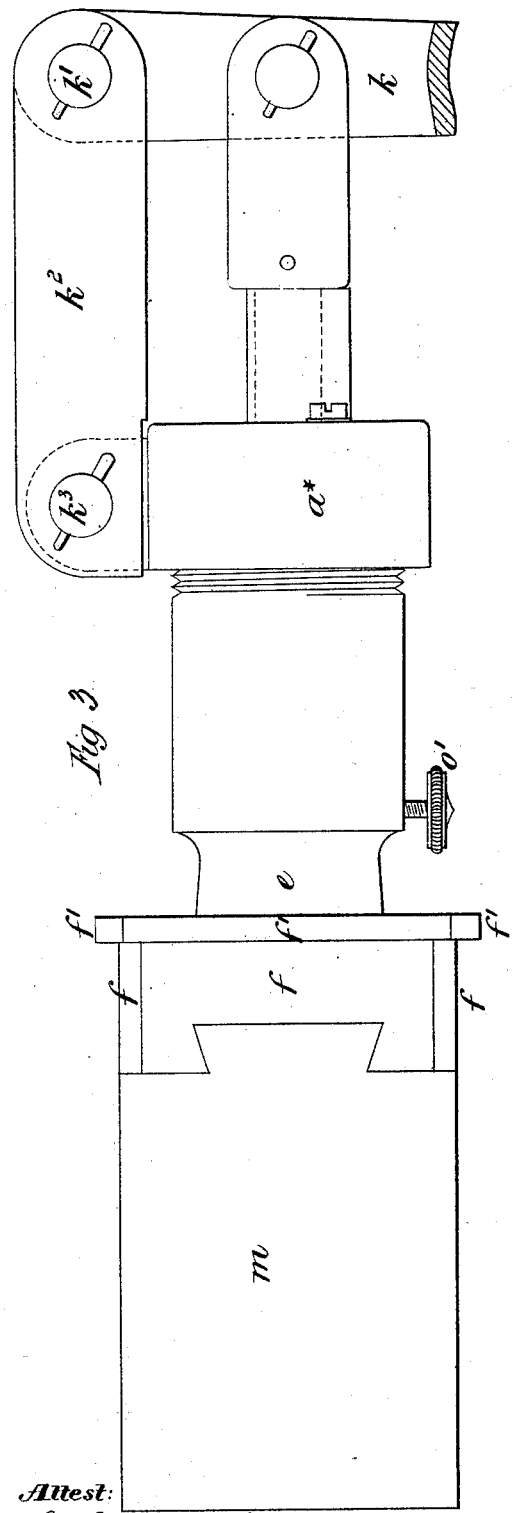
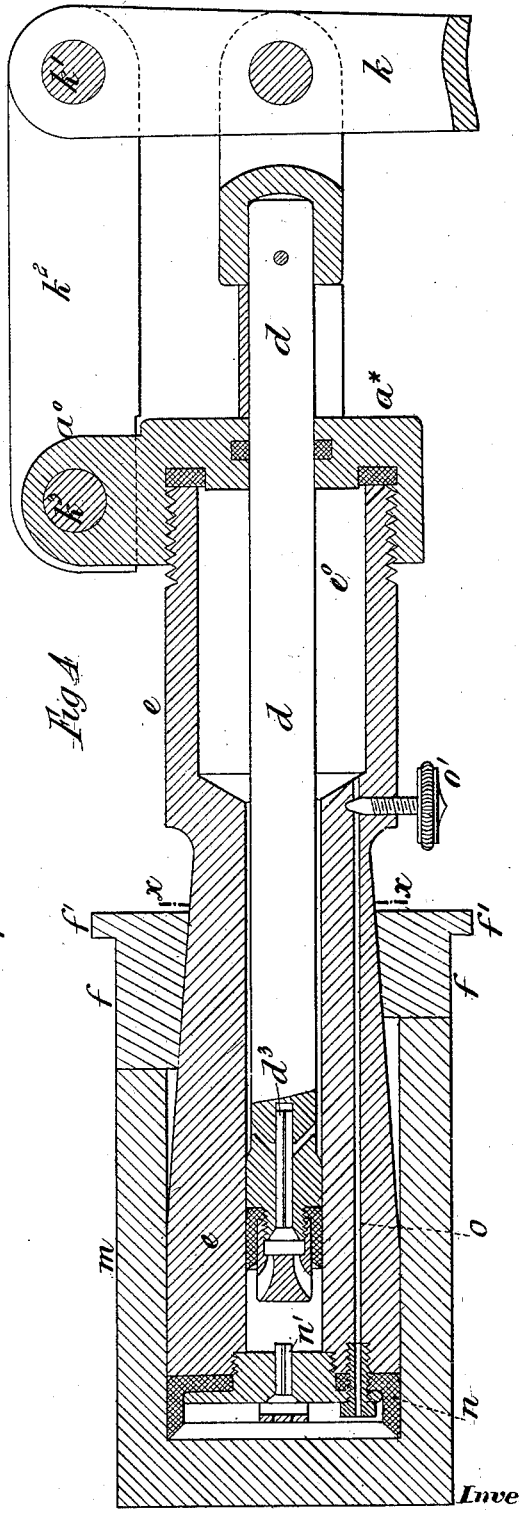
Attest:
J. A. Rutherford,
J. Henry Kaiser
Inventor.
William Tully.
By James L. Norris,
Att'y.
N. PETERS, PHOTO-LITHOGRAPHER, WASHINGTON, D.C.

W. TULLY.
Tube Expander.

No. 232,317.  Patented Sept. 14, 1880.

Attest:
J. A. Rutherford
J. Henry Kaiser

Inventor:
William Tully
By James L. Norris,
Atty.

UNITED STATES PATENT OFFICE.

WILLIAM TULLY, OF LONDON, ENGLAND.

TUBE-EXPANDER.

SPECIFICATION forming part of Letters Patent No. 232,317, dated September 14, 1880.

Application filed February 19, 1880. Patented in England October 21, 1879.

*To all whom it may concern:*

Be it known that I, WILLIAM TULLY, of London, England, engineer, have invented an improved apparatus for securing boiler or similar tubes in the plates or pieces by which they are supported, which apparatus is also applicable for expanding rings and for similar purposes, (for which I have obtained a patent in Great Britain, No. 4,273, bearing date October 21, 1879,) of which the following is a specification.

My invention relates to an improved implement or apparatus chiefly designed for securely fastening the ends of boiler or other tubes within the apertures provided for them in the plates or other pieces which are to hold the said tubes in the position they are to occupy in a steam-boiler or other apparatus.

My improved implement is also applicable for securing rings or ferrules in tubes, plates, or the like. It is also applicable for expanding metal rings of any kind, whatever may be the object of such expansion.

Figure 7:
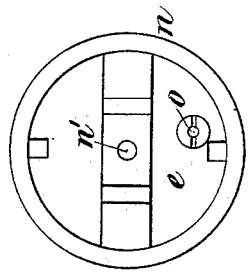
Figure 5:
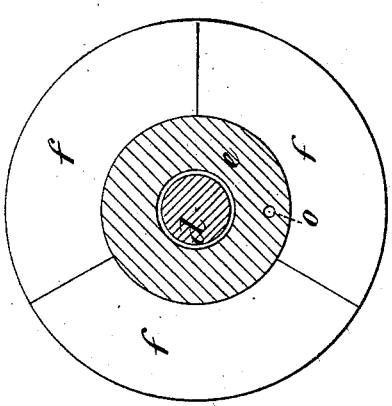
Figure 6:
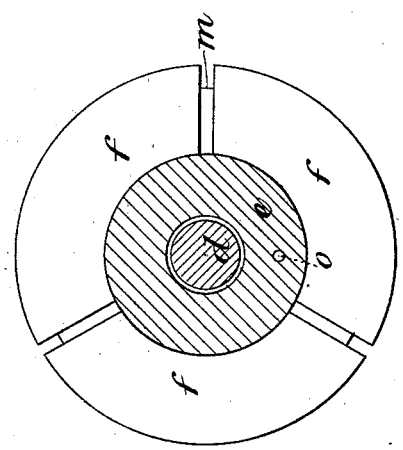

In the accompanying drawings, Figure 1 is a plan of one form of my improved apparatus, and Fig. 2 is a longitudinal central section of the same. Fig. 3 is a side elevation, and Fig. 4 is a longitudinal central section, of a modified form of my improved apparatus. Fig. 5 is a transverse section on the line $x\ x$, Fig. 4, showing the expanding lugs or segments in their normal position, and Fig. 6 is a similar section showing the said lugs expanded. Fig. 7 is an end view of the mandrel employed in the said apparatus.

Like letters indicate the same parts throughout the drawings.

Referring to Figs. 1 and 2 of the drawings, the letter A represents a strong metal cylinder, which is made in three parts or sections, $a\ b\ c$, the end of the rear section, $a$, being screw-threaded to receive a cover, $a^*$, provided with a central aperture for the passage of a rod, $d$, hereinafter described. $e$ is a mandrel, having a conical end, $e'$, as shown, and which works within the cylinder.

The front section, $c$, of the cylinder is provided with three or more movable lugs or pieces, $f$, which are designed to move laterally—that is to say, at right angles to the axis of the cylinder A. Each lug or piece $f$ is formed with a flange, rim, or shoulder, $f'$, and with a dovetail projection, $f^2$, (see Fig. 1,) these projections being designed to fit into corresponding recesses made in the forward end of the section $c$ of the cylinder. The three or other number of lugs or pieces $f$ are so constructed that they form so many segments of a circle, and when not expanded fit closely together, so that a cylindrical piece is provided with an annular projecting flange at the rear thereof and with a central aperture, within which the tapering or conical end $e'$ of the mandrel $e$ works to cause the segments $f$ to separate and slide outward laterally.

The cylindrical piece formed by the three segments $f$ is designed to be inserted within the end of a boiler-tube, and the annular rim $f'$ to abut against the outside of the tube, thus forming a support for the implement, and preventing the same from entering the tube farther than is required.

The rear section, $a$, of the cylinder A has a chamber, $a'$, which is supplied with a liquid, to operate as hereinafter explained, and the metal forming the front portion of this section is bored centrally to receive the forward end of the rod $d$, and also a plug, $a^2$, provided with a valve, $a^3$. Within the forward end of the rod $d$ a central port or aperture, $d'$, is provided, which is in communication with two inclined lateral ports or apertures, $d^2\ d^2$, leading into the chamber $a'$. In the port or aperture $d'$ a valve, $d^3$, is fitted. The valves $a^3$ and $d^3$ allow the liquid to pass forward from the chamber $a'$, but will not permit the passage of any liquid in a rearward direction.

A ring, $d^4$, of leather, india-rubber, or other suitable material, is fitted over a screw-cap, $d^5$, screwed upon the forward end of the rod $d$, the ring $d^4$ being designed to provide a close fit with the walls of the cylindrical aperture in which it slides. Two channels, $g\ g'$, are provided in the metal forming the forward part of the cylinder-section $a$, one of which channels, $g$, leads into the rear end of the chamber $b'$, the rear end of this channel communicating with the chamber $a'$. The other channel, $g'$, also communicates at its rear end with the chamber $a'$, and is continued forward through the side or wall of the cylinder-section $b$, and at its front end communicates with the forward end of the chamber $b'$ of the cylinder-section $b$. At the front end of the section $a$ there is a channel or space, $h^*$, the metal in front of which forms a covering, $b^2$, at the rear of the chamber $b'$, the said space being in communication, through the aperture $h$, with the chamber $b'$, excepting when this aperture is closed, as hereinafter described. The other aperture, $h'$, in the covering $b^2$ forms a continuation of the channel $g$. There is also a channel, $h^2$, in the side or wall of the cylinder-section $b$, which channel communicates at its front end with the front part of the chamber $b'$, as shown, and at its rear end with the channel or space $h^*$.

In the operation of this apparatus it is necessary, when communication is open, through the channel $g$, between the chambers $a'$ and $b'$, and, through the aperture $h^2$, between the space $h^*$ and the chamber $b'$, that the communication between the chambers $a'$ and $b'$, through the channel $g'$, and between the space $h^*$ and the chamber $b'$, through the channel $h$, should be closed, and vice versa. Therefore, for opening and closing the communication, as may be desired, I provide plugs $i$ and $i'$, arranged to work through glands $i^*$, provided in the walls of the cylinder and furnished with heads, to enable them to be easily manipulated; or I may employ screws, which may be readily screwed in or withdrawn, as desired, or any other suitable devices may be employed for the purpose.

At about the center of the cylinder-section $b$ I provide a diaphragm or partition, $b^3$, having a central aperture for the passage of the rear part, $e^2$, of the mandrel $e$. Upon the end of this part $e^2$, I arrange a disk, $e^3$, (preferably made of steel or other suitable material,) the front and rear faces of which are each furnished with a disk of leather or similar material, $e^4$ $e^5$. The disks $e^3$ $e^4$ $e^5$ are secured to the rear part, $e^2$, of the mandrel by means of a screw, $e^6$, as shown.

When the lugs or segments $f$ are caused to slide outward by the mandrel they necessarily become separated; consequently there are then three or more openings or spaces between the segments, so that there will be corresponding portions of the internal surface of the tube not in contact with any portion of the segments $f$ unless the said segments are caused to have a slight rotation. I therefore provide the internal surface of the cylinder-section $c$ with inclined grooves or channels $c^*$, corresponding with projections $e^*$, provided upon the surface of the conical or tapered portion of the mandrel $e$, and the said mandrel is provided with a pin, $e^7$, which slides freely in a slot, $e^8$, in the part $b$ of the cylinder, but prevents any rotary movement of the said mandrel when moved longitudinally; or the said mandrel may be provided with any other suitable device to prevent any such rotary movement. Therefore, whenever the latter is forced forward the section $c$ has imparted to it a slight rotary movement, in which the segments $f$ participate. By means of this arrangement the whole of that portion of the internal surface of the tube which is around the lugs or segments $f$ is operated upon by the latter when they are expanded.

A lever or handle, $k$, is connected to the rear end of the rod $d$, and by means of this lever the said rod is operated. This lever is connected at $k'$ with a link, $k^2$, which is attached at $k^3$ to a lug or ear, $a^6$, on the outside of the cylinder; or the said lever may be otherwise connected with the said cylinder.

The operation of the apparatus above described is as follows—that is to say: Water, oil, or other suitable liquid is placed within the chamber $a'$, and the cylindrical piece formed by the lugs or segments $f$ is inserted within the end of the tube to be expanded. The two plugs $i'$ are turned so as to leave the channel $g'$ and the aperture $h$ open, and the two plugs $i$ are turned so as to close the channels $g$ and $h^2$. The lever $k$ is then operated to and fro, moving the rod $d$ backward and forward alternately. At each backward movement of the rod some of the liquid in the chamber $a'$ passes through the ports or apertures $d^2$ $d^2$ and $d'$, and by the valves $d^3$ and $a^3$ into the space $h^*$. Then, by moving forward the rod $d$, the liquid is driven through the aperture $h$ into the chamber $b'$, and the mandrel is thereby forced forward. In this forward movement of the mandrel such liquid which remains in front of the disks $e^3$ $e^4$ $e^5$ from a previous operation of the apparatus will pass back through the channel $g'$ into the chamber $a'$. When the expansion of the tube has been effected the plugs $i'$ are turned to close the channel $g'$ and aperture $h$, and the plugs $i$ are turned to open the channels $g$ and $h^2$. The lever $k$ is then operated as before, and liquid is forced, in the same manner as above described, from the chamber $a'$ into the space $h^*$; but, as the aperture $h$ is now closed, it cannot enter the rear part of the chamber $b'$, but the channel $h^2$ being open, the liquid passes through the same to the forward end of the chamber $b'$—that is to say, to the space in front of the disks $e^3$ $e^4$ $e^5$. The liquid displaced from the rear end of the chamber $b'$ passes through the aperture $h'$ to the channel $g$, and thus into the chamber $a'$. The mandrel is thus withdrawn, leaving the lugs or segments $f$ free to slide inward laterally. The apparatus may then be removed from the tube, and is ready to be inserted within another.

By reason of the grooves $c^*$ and projections $e^*$ the mandrel receives a slight movement of rotation, as above explained, so that the tube end is expanded evenly, and any projections in the metal are pressed out and a firm joint is made.

Any other suitable well-known means for causing the sections $f$ to rotate may be employed.

It will be seen that, whether the mandrel is to be forced forward or withdrawn, the lever $k$ and the rod $d$ are operated in precisely the same manner, the only parts requiring adjustment being the screw-plugs $i$ and $i'$.

The sections $a$ and $b$ are attached by being screwed together, and the section $c$ is fitted to the section $b$ in such a manner as to rotate by means of screws $l$ entering slots $l'$ in the section $b$, which slots are made of sufficient length to allow this section to rotate the required distance.

The construction of the apparatus may be modified as shown in Figs. 3, 4, 5, 6, and 7, in which $m$ represents a metal cylinder open at one end. Within this cylinder I insert a mandrel, $e$, which is constructed as follows—that is to say: It is circular in transverse section, and tapers gradually from near its front to its rear end. The front or widest end is furnished with a circular disk or plate, $n$, of leather, india-rubber, or other suitable material, to prevent the escape of liquid between the interior surface of the cylinder and the front end of the mandrel in the operation of the said apparatus; or, instead of the leather or similar material, I may employ expansion-rings of metal. At the rear or smaller part of the said mandrel there is a chamber or receptacle, $e^0$, designed to contain water or other liquid. The said mandrel and chamber are preferably formed in one piece. The mandrel $e$ is hollow, and is provided at its front end with a valve, $n'$, to afford communication between the interior of the mandrel and the cylinder $m$, within which it works. A rod, $d$, passes through the chamber $e^0$, and one end thereof extends through a stuffing-box provided in the cap or cover $a^*$, screwed upon the rear part of this chamber. The other end of the rod $d$ passes into the mandrel, and is provided with leather or other suitable material to cause it to fit tightly to the interior surface of the mandrel and prevent the escape of liquid when it is working. This end of the rod $d$ forms a plunger, and is provided with a valve, $d^3$, to allow of the passage of liquid in a forward but not in a backward direction. The rear end of the rod $d$ is attached to the lever $k$, or other suitable appliance so connected and arranged that the rod may thereby be readily caused to move to and fro.

At the open or rear end of the cylinder I provide the movable lugs or segments $f$, which are constructed as hereinbefore described. They are arranged to slide laterally within dovetail grooves or openings cut in this end of the cylinder to receive them. The said lugs or segments are each provided with a projecting flange, $f'$, as hereinbefore described. The portion of these movable lugs or segments in front of the flange fits within the end of the tube to be expanded.

The chamber $e^0$ in the rear end of the mandrel is supplied with a sufficient quantity of water, oil, spirit, or other liquid to cause the mandrel to move backward when the said liquid passes from this chamber to the front part of the cylinder $m$.

Both forms of the apparatus as above described are designed chiefly to be used with a liquid; but such slight modifications as would be necessary to adapt them for the employment of steam, air, or gas, instead of water or other liquid, will be readily understood without further description.

The water or other liquid having been supplied within the chamber $e^0$, the lever $k$, or other appliance connected with the rear end of the rod $d$, is operated, causing the latter to work to and fro and force some of the liquid at each forward stroke, through the valve $n'$ at the front end of the mandrel, into the cylinder.

Great pressure is thereby exerted upon the front end of the said mandrel, which gradually recedes at each forward stroke of the rod $d$. The inner surface of each of the movable lugs or segments $f$ conforms to a portion of the exterior surface of the mandrel with which they are in contact, and by reason of the tapering or conical shape of the latter they are forced out laterally with great power as the mandrel recedes, as shown in Fig. 6. The outer surface of the movable lugs or pieces being within the end of the tube to be expanded, the latter is thus subjected to an enormous pressure, and cannot fail to be firmly united to the plate or other piece.

I provide a passage for the return of the liquid from the cylinder $m$ to the chamber $e^0$ by making a channel, $o$, through the metal forming the wall of the said chamber and through a portion of that of the hollow mandrel, as shown. A valve or tap, $o'$, is provided at the rear end of the channel $o$, which valve is closed when the apparatus is at work and opened when it is desired to remove the pressure of the mandrel from the movable lugs or segments.

In some cases I may dispense with the channel $o$, and provide at the front end of the mandrel $e$ a chamber by turning out the metal, so as to leave a space of greater circumference than that behind it. When this is done the apparatus may be released from the tube by pressing forward the rod $d$ into the said forward chamber until the end of the rod comes in contact with the valve $n'$ in the front end of the mandrel $e$. The rod $d$ then holds this valve open, and the mandrel can be easily pushed forward to its original position, the liquid flowing back through the said valve into the forward chamber, and thence to its original position in the rear chamber, where it remains ready for the next operation.

It will be understood that as the mandrel $e$ is pushed forward its pressure is removed from the movable lugs or segments $f$, and that of the latter from the interior of the tube, whereupon the apparatus may be withdrawn with the utmost ease.

What I claim is—

1. The combination of a cylinder provided with radially-movable segments, a reciprocating tapering mandrel for moving said segments outwardly, two fluid-chambers having communication with each other and provided with means, substantially as described, for controlling this communication when required, a reciprocating rod provided with ports or apertures, as set forth, and valves, such as specified, for permitting the flow of fluid from one chamber to the other for actuating the mandrel, all essentially as described.

2. The combination of a cylinder provided with radially-movable segments, a reciprocating tapering mandrel for moving said segments outwardly, two fluid-chambers connected by channels, means, substantially as described, for controlling the communication between the chambers through said channels, a reciprocating rod provided with ports and valves, such as specified, for permitting the flow of fluid from one chamber to the other for actuating the mandrel, all essentially as herein set forth.

WILLIAM TULLY.

Witnesses:
  J. T. KNOWLES,
  LEWIS SANDERSON,
*Both of 8 Southampton Buildings, London.*